(12) United States Patent
Nunokawa et al.

(10) Patent No.: US 11,660,634 B2
(45) Date of Patent: May 30, 2023

(54) METHOD OF PRODUCING RUBBER SEAL

(71) Applicant: HONDA MOTOR CO., LTD., Tokyo (JP)

(72) Inventors: Kazuo Nunokawa, Wako (JP); Yasunori Murakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 17/198,578

(22) Filed: Mar. 11, 2021

(65) Prior Publication Data
US 2021/0283648 A1    Sep. 16, 2021

(30) Foreign Application Priority Data

Mar. 13, 2020  (JP) .............................. JP2020-043787

(51) Int. Cl.
*B05D 1/28* (2006.01)
*H01M 8/0286* (2016.01)
*H01M 8/0284* (2016.01)
*H01M 8/0276* (2016.01)
*H01M 8/028* (2016.01)
*B05D 1/32* (2006.01)

(52) U.S. Cl.
CPC .............. *B05D 1/28* (2013.01); *H01M 8/028* (2013.01); *H01M 8/0276* (2013.01); *H01M 8/0284* (2013.01); *H01M 8/0286* (2013.01); *B05D 1/32* (2013.01); *Y02P 70/50* (2015.11)

(58) Field of Classification Search
CPC ......... B05D 1/28; B05D 1/32; H01M 8/0276; H01M 8/028; H01M 8/0284; H01M 8/0286; Y02P 70/50

USPC ................................. 427/115, 356, 358, 282
See application file for complete search history.

(56) References Cited

U.S. PATENT DOCUMENTS

| | | | | |
|---|---|---|---|---|
| 4,919,969 A * | 4/1990 | Walker | ..................... | B41M 1/12 277/922 |
| 5,368,883 A * | 11/1994 | Beaver | ................ | H01L 21/4867 101/127 |
| 5,593,080 A * | 1/1997 | Teshima | ............... | H05K 3/3485 101/127 |
| 6,047,637 A * | 4/2000 | Chan | ....................... | B41M 1/12 228/248.1 |
| 6,363,847 B1 * | 4/2002 | Murakami | ........... | H05K 3/1225 101/127 |
| 6,548,106 B1 * | 4/2003 | Murakami | ........... | H05K 3/1225 101/127 |
| 8,679,697 B1 * | 3/2014 | Skala | .................. | H01M 8/0276 429/508 |
| 11,431,002 B2 * | 8/2022 | Yang | .................... | H01M 8/0286 |
| 2009/0197147 A1 * | 8/2009 | Fly | ...................... | H01M 8/2483 277/650 |

(Continued)

*Primary Examiner* — Brian K Talbot
(74) *Attorney, Agent, or Firm* — Carrier Shende & Associates, P.C.; Joseph P. Carrier; Anne G. Sabourin

(57) ABSTRACT

A method of producing a rubber seal includes placing a screen with an opening, above a workpiece including a base portion and a bead base protruding from the base portion and applying a liquid material for forming the rubber seal, onto a top part of the bead base through the opening. In the production, the liquid material is applied onto the top part by moving a squeegee along a surface of the screen in a state where a stopper portion is disposed at a position adjacent to the bead base within an area of the base portion and between the screen and the workpiece.

4 Claims, 6 Drawing Sheets

(56) References Cited

U.S. PATENT DOCUMENTS

2012/0231370 A1\* 9/2012 Rock .................. H01M 8/0258
                                                          429/508
2018/0212259 A1   7/2018 Yang et al.
2019/0260041 A1\* 8/2019 Fay .................... H01M 8/0286

\* cited by examiner

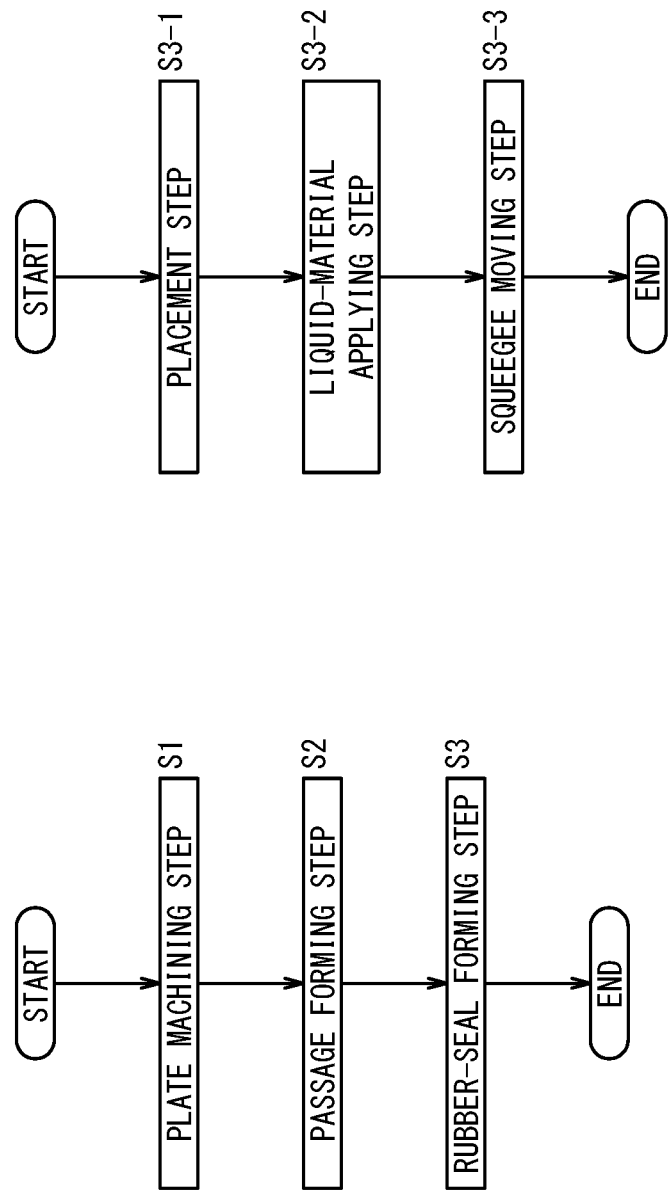

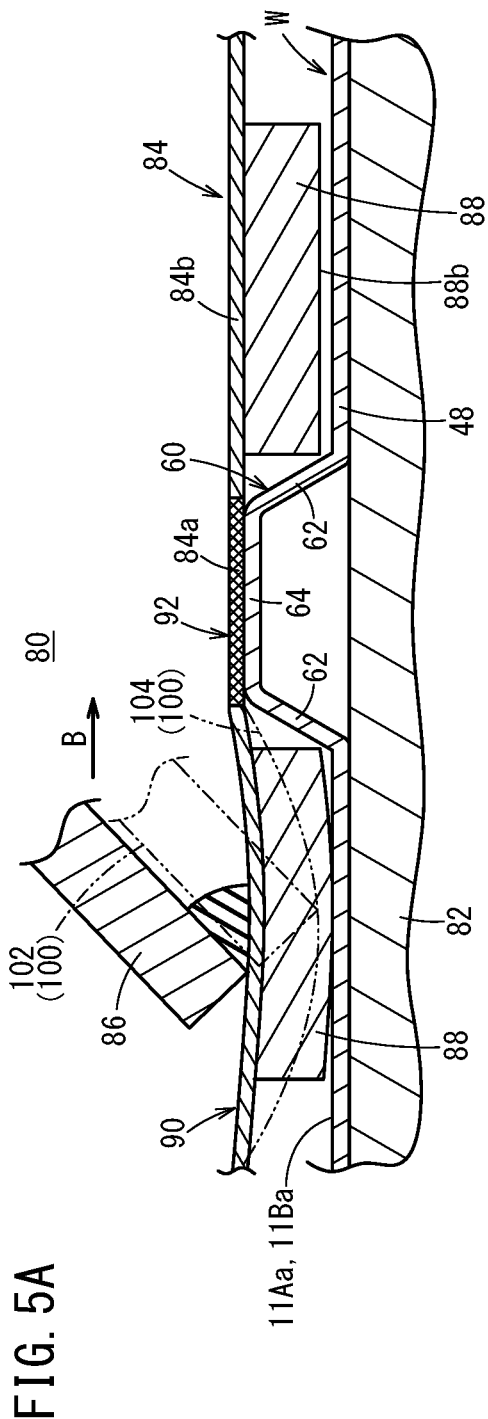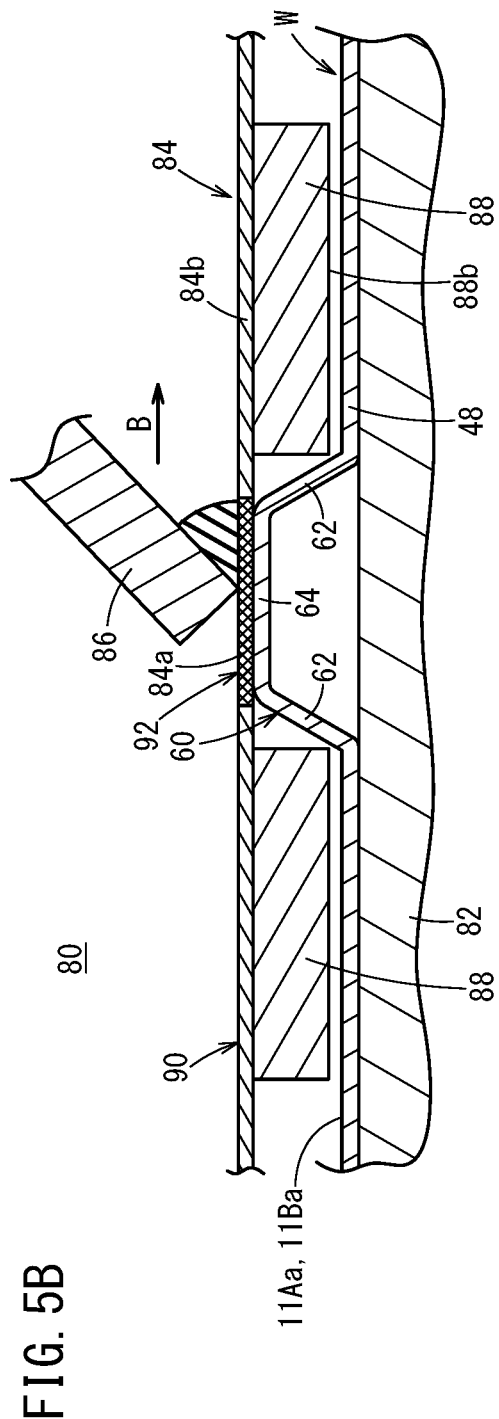

METHOD OF PRODUCING RUBBER SEAL

CROSS-REFERENCE TO RELATED APPLICATION

This application is based upon and claims the benefit of priority from Japanese Patent Application No. 2020-043787 filed on Mar. 13, 2020, the contents of which are incorporated herein by reference.

BACKGROUND OF THE INVENTION

Field of the Invention

The present invention relates to methods of producing rubber seals.

Description of the Related Art

A typical fuel cell includes a membrane electrode assembly (MEA) formed of a stack of an anode, a solid polymer electrolyte membrane, and a cathode and a pair of metal separators serving as bipolar plates that hold the MEA. Each metal separator is in contact with the MEA and includes a flow field, through which reactant gas used for electricity generation flows, between the contact parts. Seals are formed between the metal separator and the MEA to prevent leakage of the reactant gas.

Metal separators of this type include those with metal beads (bead bases) integral to and protruding from surfaces of the separators to form the above-described seals (see U.S. Patent Application Publication No. 2018/0212259). A bead base of a metal separator disclosed in U.S. Patent Application Publication No. 2018/0212259 is provided with a microseal (rubber seal) formed on the top part of the bead base by screen printing.

SUMMARY OF THE INVENTION

In screen printing for forming a rubber seal on a metal separator, a screen having an opening in a position facing a bead base is disposed above a workpiece. Then, a liquid material for forming rubber seals is applied on the screen, and a squeegee is moved along a surface of the screen to apply the liquid material to the top part of the bead base through the opening.

However, in a case of a metal separator having a surface with a large projection or recess such as the bead base, part of the screen is often depressed toward the workpiece in an area where the bead base does not exist (for example, an area adjacent to the bead base) due to the pressing by the squeegee during screen printing. When the screen is depressed, the squeegee often jumps up from the screen in the vicinity of the bead base. This reduces the pressing force of the squeegee (surface pressure on the screen) in the application area, causing variations in the thickness and shape of the rubber seal in the production of the rubber seal.

The present invention has been devised taking into consideration the aforementioned problems, and has the object of providing a method of producing a rubber seal with improved uniformity and stability in thickness and shape achieved by preventing a screen from being depressed while a squeegee moves, by using a simple structure.

To achieve the above-described object, a method of producing a rubber seal according to an aspect of the present invention includes placing a screen with an opening, above a workpiece including a base portion and a protruding portion protruding from the base portion and applying a liquid material for forming the rubber seal, onto a top part of the protruding portion through the opening by moving a squeegee along a surface of the screen in a state where a stopper portion is disposed at a position adjacent to the protruding portion within an area of the base portion and between the screen and the workpiece.

According to the method of producing the rubber seal, the rubber seal with improved uniformity and stability in thickness and shape can be formed by preventing the screen from being dropped while the squeegee moves, using a simple structure.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4A is a flowchart illustrating a method of producing a metal separator, and FIG. 4B is a flowchart illustrating the method of producing the rubber seal;

FIG. 5A is a first diagram illustrating how a screen works while a squeegee moves, and FIG. 5B is a second diagram illustrating how the screen works while the squeegee moves.

DESCRIPTION OF THE PREFERRED EMBODIMENT

Figure 1:
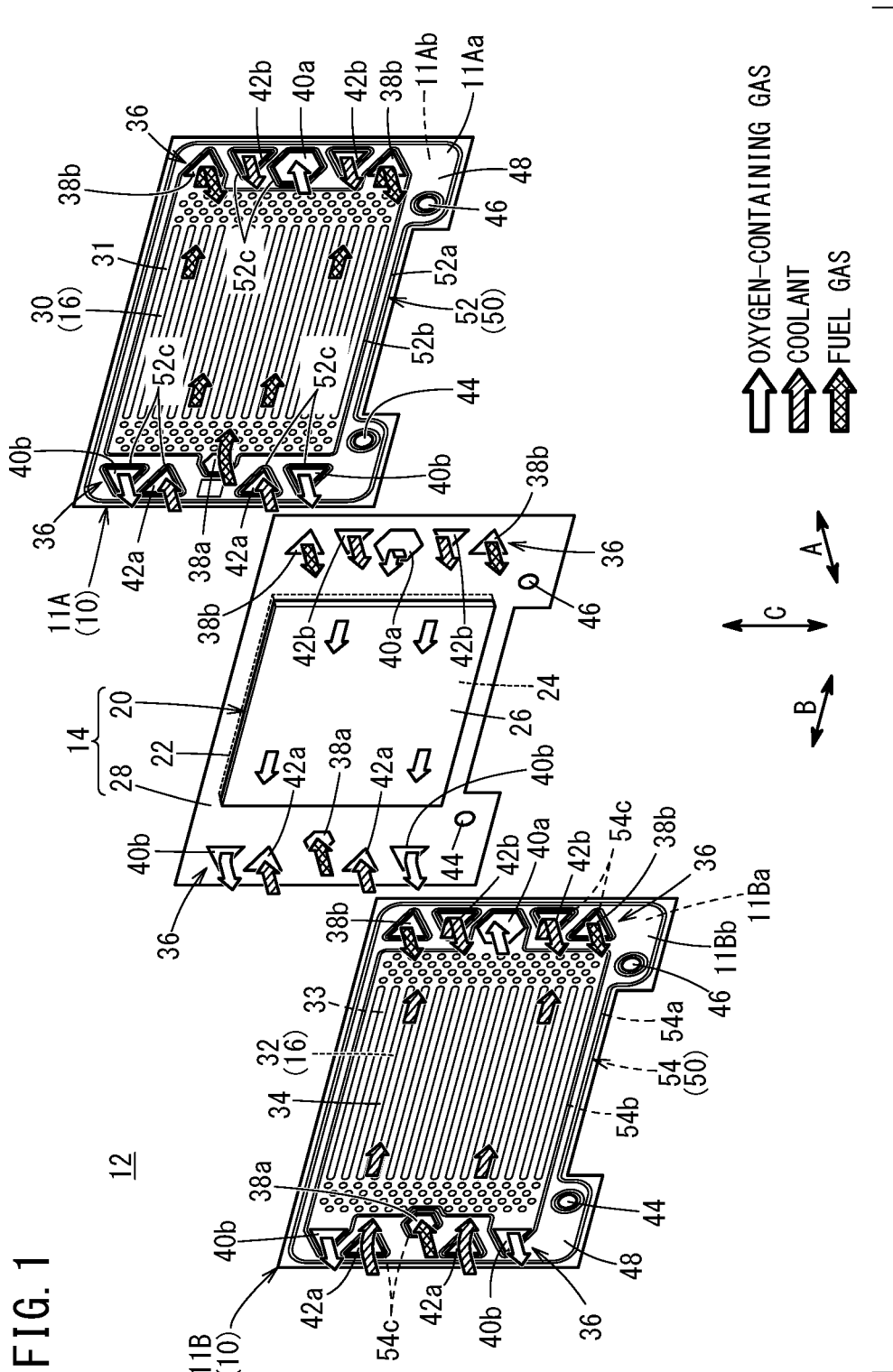
FIG. 1 is an exploded perspective view of metal separators to which a method of producing a rubber seal according to an embodiment of the present invention is applied and a fuel cell to which the metal separators are applied.

A preferred embodiment according to the present invention will be described in detail below with reference to the accompanying drawings.

A method of producing a rubber seal 70 according to an embodiment of the present invention will now be described. In the example below, rubber seals 70 are formed on sealing beads 50 on metal separators 10 in a fuel cell 12 (power generation cell) illustrated in FIG. 1. The method of producing the rubber seal 70 is not limited to the application to the metal separators 10 and may be applied to various workpieces including protrusions that have the rubber seals 70 formed on top portions thereof.

The fuel cell 12 includes a membrane electrode assembly 14 with a resin frame (hereinafter referred to as "resin-frame-equipped MEA 14") and the pair of metal separators 10 (11A and 11B) holding the resin-frame-equipped MEA 14 therebetween. In the fuel cell 12, fuel gas such as hydrogen flows between one of the metal separators (11A) and the resin-frame-equipped MEA 14, while oxygen-containing gas such as oxygen flows between the other metal separator (11B) and the resin-frame-equipped MEA 14. The electrochemical reaction between the fuel gas and the oxygen-containing gas generates electricity.

For example, the fuel cell 12 has a horizontally (or vertically) oblong rectangular shape elongated in a direction of an arrow B. A plurality of fuel cells 12 are stacked in a direction of an arrow A to be configured as a fuel cell stack (not illustrated). Such fuel cell stacks are installed in, for example, fuel cell vehicles.

The resin-frame-equipped MEA 14 constituting the fuel cell 12 together with the metal separators 10 includes a membrane electrode assembly 20 (hereinafter referred to as "MEA 20") and a resin frame member 28 joined to and surrounding outer edge portions of the MEA 20 extending in the direction of the arrow B and a direction of an arrow C. Instead of using the resin frame member 28, the fuel cell 12 may include an electrolyte membrane 22 (described below) protruding from electrodes (an anode 24 and a cathode 26) outward (in the directions of the arrows B and C).

The MEA 20 includes the electrolyte membrane 22, the anode 24 disposed on a first side of the electrolyte membrane 22, and the cathode 26 disposed on a second side of the electrolyte membrane 22. A solid polymer electrolyte membrane (cation exchange membrane), which is a thin membrane of perfluorosulfonic acid containing water, for example, is applied to the electrolyte membrane 22. The electrolyte membrane 22 may be made of hydrocarbon-based (HC-based) electrolyte instead of fluoride containing electrolyte.

Each of the anode 24 and the cathode 26 includes an electrode catalyst layer (not illustrated) joined to one surface of the electrolyte membrane 22 and a gas diffusion layer (not illustrated) laminated on the electrode catalyst layer. The electrode catalyst layer is formed by, for example, uniformly applying porous carbon particles, carrying platinum alloy on their surfaces, on a surface of the gas diffusion layer together with ionic conductive polymer binder. The gas diffusion layer is formed of carbon paper, carbon cloth, or the like.

The resin frame member 28 is formed of a film with a fixed thickness. The inner edge of the resin frame member 28 is held between the outer edge portions of the anode 24 and the cathode 26. The resin frame member 28 enables a reduction in the size of the electrolyte membrane 22 and thus reduces production costs. In addition, the contact pressure between the metal separators 10 and the resin frame member 28 can be appropriately adjusted by using the resin frame member 28. Materials of the resin frame member 28 include, for example, polyphenylene sulfide (PPS), polyphthalamide (PPA), polyethylene naphthalate (PEN), polyethersulfone (PES), liquid crystal polymer (LCP), polyvinylidene difluoride (PVDF), silicone, fluorine, modified polyphenylene ether (m-PPE), polyethylene terephthalate (PET), polybutylene terephthalate (PBT), and modified polyolefin.

The metal separators 10 are formed by press-forming, for example, steel plates, stainless steel plates, aluminum plates, plated steel plates, or metal plates with anticorrosive surfaces so as to have corrugated cross sections. The thickness of the metal separators 10 is not particularly limited but is preferably in the range of, for example, 50 to 500 μm. In this embodiment, the thickness is substantially 100 μm.

As described above, the pair of metal separators 10 each form a reactant gas flow field 16 through which a reactant gas (fuel gas or oxygen-containing gas) flows along the surface of the resin-frame-equipped MEA 14. In the description below, the one of the metal separators 10 stacked on the first surface of the resin-frame-equipped MEA 14 is also referred to as "first separator 11A", and the other metal separator 10 stacked on the second surface of the resin-frame-equipped MEA 14 is also referred to as "second separator 11B". When a plurality of fuel cells 12 are stacked, the first separator 11A of a fuel cell 12 and the second separator 11B of another fuel cell 12 are in contact with each other. The first separator 11A and the second separator 11B are joined together at the outer edges by, for example, welding, brazing, or crimping to form an integral joint separator. The resulting joint separators are then stacked on the resin-frame-equipped MEAs 14.

The first separator 11A includes a fuel gas flow field 30 (reactant gas flow field 16) through which fuel gas flows, on a surface 11Aa facing the anode 24 of the resin-frame-equipped MEA 14. The fuel gas flow field 30 is made up of linear grooves (or wavy grooves) formed between a plurality of ridges (projections) 31 extending on the first separator 11A in the direction of the arrow B (horizontal direction).

The second separator 11B includes an oxygen-containing gas flow field 32 (reactant gas flow field 16) through which oxygen-containing gas flows, on a surface 11Ba facing the cathode 26 of the resin-frame-equipped MEA 14. For convenience, flows of the oxygen-containing gas are illustrated on the cathode 26 in FIG. 1. The oxygen-containing gas flow field 32 is formed of linear grooves (or wavy grooves) formed between a plurality of ridges (projections) 33 extending on the second separator 11B in the direction of the arrow B (horizontal direction).

Moreover, when the plurality of fuel cells 12 are stacked, a surface 11Ab of the first separator 11A of a fuel cell 12 and a surface 11Bb of the second separator 11B of another fuel cell 12 are in contact with each other, and a coolant flow field 34 through which coolant (for example, water) flows is formed between the surfaces. The coolant flow field 34 is formed between the back surface of the fuel gas flow field 30 of the first separator 11A and the back surface of the oxygen-containing gas flow field 32 of the second separator 11B when the first separator 11A and the second separator 11B are stacked together.

In addition, the fuel cell 12 (the first separator 11A, the second separator 11B, and the resin frame member 28) is provided with a plurality of fluid passages 36 through which fuel gas, oxygen-containing gas, and coolant flow in the direction of the arrow A. Each fuel cell 12 has, as the fluid passages 36, one fuel-gas inlet passage 38a, two oxygen-containing gas outlet passages 40b, and two coolant inlet passages 42a formed in a first edge portion of the long side direction (extending in the direction of the arrow B). The fuel-gas inlet passage 38a, the two oxygen-containing gas outlet passages 40b, and the two coolant inlet passages 42a extend through the first separator 11A, the second separator 11B, and the resin frame member 28 in the direction of the arrow A.

The fuel-gas inlet passage 38a is the middle one of the five fluid passages 36 arranged in the vertical direction (direction of the arrow C). The fuel-gas inlet passage 38a communicates with the fuel gas flow field 30 of the first separator 11A so that fuel gas flows into the fuel gas flow field 30.

The two coolant inlet passages 42a are disposed above and below the fuel-gas inlet passage 38a so as to sandwich the fuel-gas inlet passage 38a therebetween. The coolant inlet passages 42a communicate with the coolant flow fields 34 between the first separators 11A and the second separators 11B so that coolant flows into the coolant flow fields 34.

The two oxygen-containing gas outlet passages 40b are respectively disposed above the upper coolant inlet passage 42a and below the lower coolant inlet passage 42a so as to sandwich the fuel-gas inlet passage 38a and the two coolant inlet passages 42a therebetween. The oxygen-containing gas outlet passages 40b communicate with the oxygen-containing gas flow field 32 of the second separator 11B so that oxygen-containing gas flows out of the oxygen-containing gas flow field 32.

Each fuel cell 12 has, as the fluid passages 36, one oxygen-containing gas inlet passage 40a, two fuel-gas outlet passages 38b, and two coolant outlet passages 42b formed in a second edge portion of the long side direction (extending in the direction of the arrow B). The oxygen-containing gas inlet passage 40a, the two fuel-gas outlet passages 38b, and the two coolant outlet passages 42b extend through the first separator 11A, the second separator 11B, and the resin frame member 28 in the direction of the arrow A.

The oxygen-containing gas inlet passage 40a is the middle one of the five fluid passages 36 arranged in the direction of the arrow C. The oxygen-containing gas inlet passage 40a communicates with the oxygen-containing gas flow field 32 of the second separator 11B so that oxygen-containing gas flows into the oxygen-containing gas flow field 32.

The two coolant outlet passages 42b are disposed above and below the oxygen-containing gas inlet passage 40a so as to sandwich the oxygen-containing gas inlet passage 40a therebetween. The coolant outlet passages 42b communicate with the coolant flow fields 34 between the first separators 11A and the second separators 11B so that coolant flows out of the coolant flow fields 34.

The two fuel-gas outlet passages 38b are respectively disposed above the upper coolant outlet passage 42b and below the lower coolant outlet passage 42b so as to sandwich the oxygen-containing gas inlet passage 40a and the two coolant outlet passages 42b therebetween. The fuel-gas outlet passages 38b communicate with the fuel gas flow field 30 of the first separator 11A so that fuel gas flows out of the fuel gas flow field 30.

The numbers, positions, shapes, and the like of the fluid passages 36 (the fuel-gas inlet passage 38a, the fuel-gas outlet passage 38b, the oxygen-containing gas inlet passage 40a, the oxygen-containing gas outlet passage 40b, the coolant inlet passage 42a, and the coolant outlet passage 42b) may be set as appropriate according to required specifications. Each of the first separator 11A, the second separator 11B, and the resin frame member 28 of the fuel cell 12 is further provided with, as the fluid passages 36, a first drain hole 44 and a second drain hole 46 penetrating therethrough in the direction of the arrow A. The first drain hole 44 discharges water produced at the cathode when the fuel cell 12 generates electricity. The second drain hole 46 discharges water produced at the anode when the fuel cell 12 generates electricity.

The first separator 11A includes a base portion 48 and a first bead portion 52 (sealing beads 50) integrally formed so as to protrude from the base portion 48. The first bead portion 52 protrudes from the surface 11Aa toward the resin frame member 28 and makes contact with the resin frame member 28, to thereby provide sealing. The first bead portion 52 includes an outer bead 52a extending approximately along the outer edge of the first separator 11A and an inner bead 52b disposed inside the outer bead 52a and enclosing the fuel gas flow field 30, the fuel-gas inlet passage 38a, and the fuel-gas outlet passages 38b. The first bead portion 52 further includes passage beads 52c disposed between the outer bead 52a and the inner bead 52b, each passage bead enclosing the oxygen-containing gas inlet passage 40a, the oxygen-containing gas outlet passages 40b, the coolant inlet passages 42a, the coolant outlet passages 42b, the first drain hole 44, and the second drain hole 46.

The second separator 11B includes a base portion 48 and a second bead portion 54 (sealing beads 50) integrally formed so as to protrude from the base portion 48. The second bead portion 54 protrudes from the surface 11Ba toward the resin-frame-equipped MEA 14 and makes contact with the resin frame member 28, to thereby provide sealing. The second bead portion 54 includes an outer bead 54a extending approximately along the outer edge of the second separator 11B and an inner bead 54b disposed inside the outer bead 54a and enclosing the oxygen-containing gas flow field 32, the oxygen-containing gas inlet passage 40a, and the oxygen-containing gas outlet passages 40b. The second bead portion 54 further includes passage beads 54c disposed between the outer bead 54a and the inner bead 54b, each passage bead enclosing the fuel-gas inlet passage 38a, the fuel-gas outlet passages 38b, the coolant inlet passages 42a, the coolant outlet passages 42b, the first drain hole 44, and the second drain hole 46.

Figure 2:
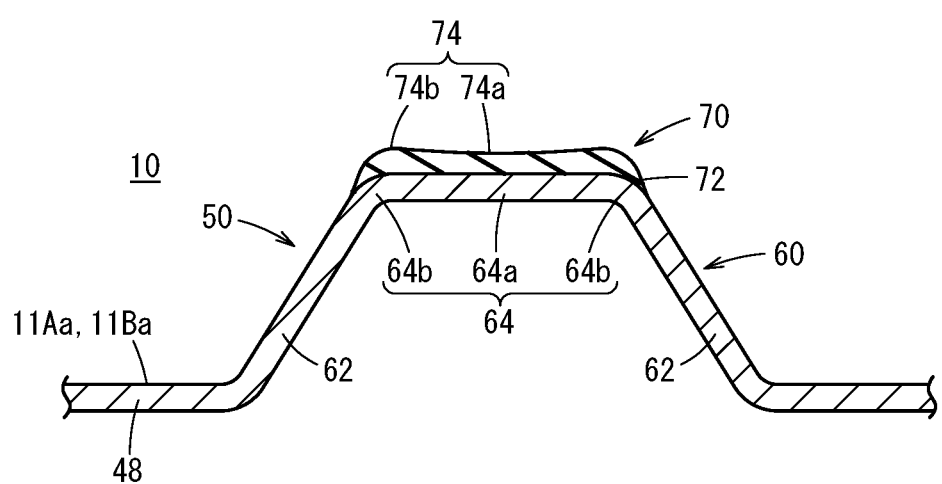
FIG. 2 is a cross-sectional view of a sealing bead including a rubber seal.

As illustrated in FIG. 2, when viewed in cross-section taken in the thickness direction of the metal separators 10, the sealing beads 50 (the first bead portion 52 and the second bead portion 54) each have a substantially trapezoidal shape protruding from the base portion 48. The base portion 48 is a thin plate portion serving as a reference plane (plate surface) of the metal separator 10. The sealing bead 50 includes a bead base 60 continuously joined to the base portion 48 (i.e., formed integrally to the metal separator 10) and the rubber seal 70 (microseal) disposed on the bead base 60.

Specifically, the bead base 60 includes a pair of inclined parts 62 continuously joined to the metal separator 10 and a top part 64 bridging a space between the upper ends of the pair of inclined parts 62. The bead base 60 is symmetric with respect to the center of the width of the top part 64. The thicknesses of the pair of inclined parts 62 and the top part 64 are substantially equal to the thickness of portions of the metal separator 10 other than the above parts (for example, 50 to 200 μm).

In this embodiment, the top part 64 includes a flat part 64a substantially parallel to the surface 11Aa or 11Ba of the metal separator 10 and a pair of curved parts 64b disposed at respective widthwise ends of the flat part 64a and continuously joined to the pair of inclined parts 62. The top part 64 of the bead base 60 may be arc-shaped. Moreover, the entire bead base 60 (the pair of inclined parts 62 and the top part 64) may be arc-shaped as a whole. The bead base 60 may be asymmetric when viewed in cross-section.

Figure 3:
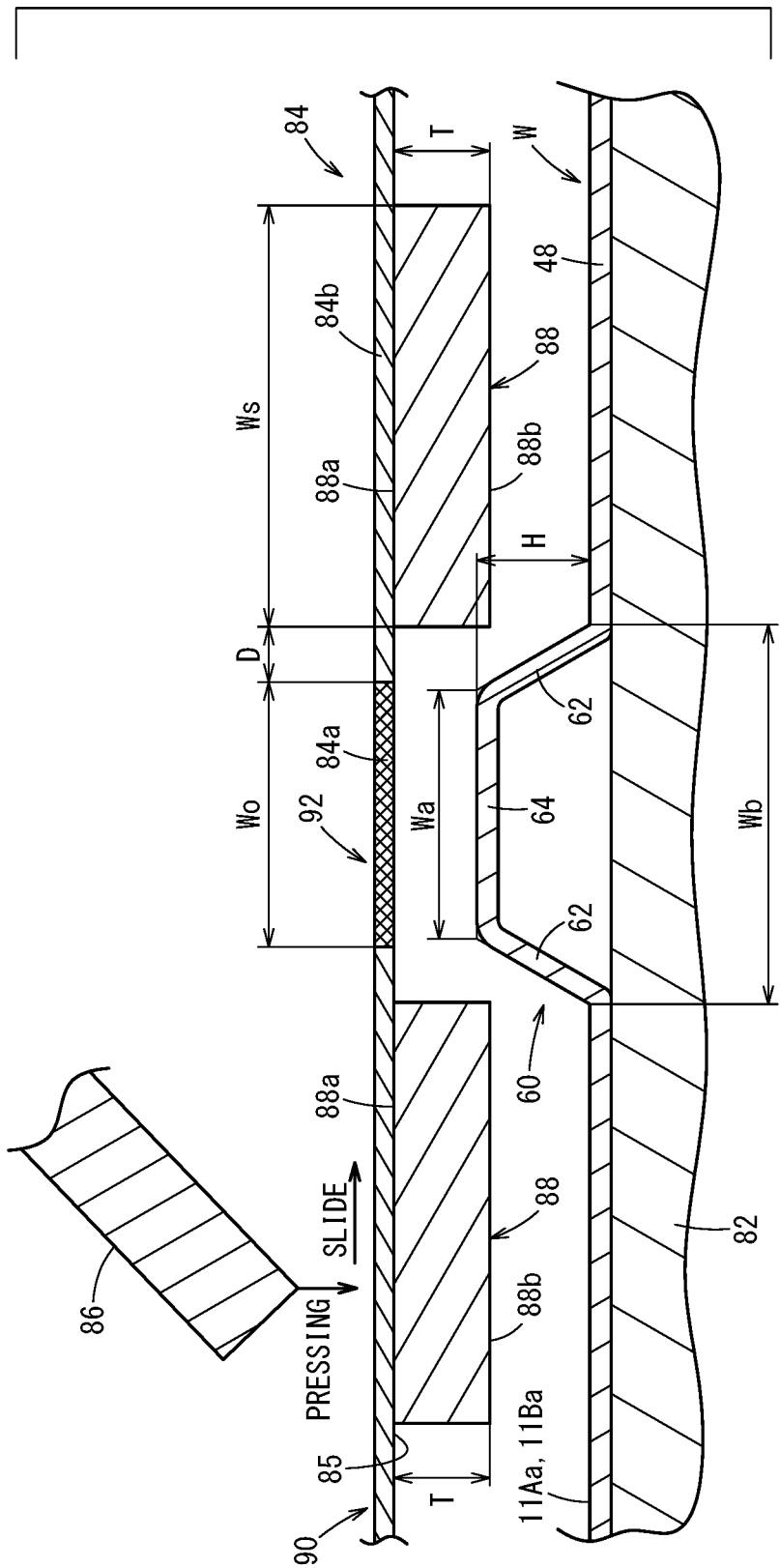
FIG. 3 is a partial sectional view of a screen printing device for forming rubber seals.

As illustrated in FIGS. 2 and 3, the width Wb of the basal part of the bead base 60 (distance between points at which the inclined parts 62 are connected to the base portion 48 of the surface 11Aa or 11Ba of the metal separator 10) is, for example, in the range of about 2.0 to 4.0 mm. The width Wa of the top part 64 of the bead base 60 (distance between points at which the inclined parts 62 are connected to the top part 64) is, for example, in the range of about 1.0 to 3.5 mm. The height H of the bead base 60 is set within the range of 10 to 35% of the width Wb of the bead base 60. The bead base 60 is press-formed at the same time that the press forming is performed to form the reactant gas flow field 16 of the metal separator 10. The bead base 60 may be formed in a process different from the process of forming the reactant gas flow field 16.

When viewed in cross-section taken in the thickness direction of the metal separator 10, the rubber seal 70 protrudes from the top part 64 of the press-formed bead base 60. The rubber seal 70 is formed by screen printing, more specifically, by applying a liquid material (including gel and semi-solid materials) for forming rubber seals on the bead base 60 and then curing (i.e., hardening) the material. The resulting rubber seal 70 has a substantially trapezoidal shape with an appropriate thickness (membrane thickness).

The outer surface of the rubber seal 70 includes a pair of inclined side surfaces 72 and a protruding end surface 74 connecting the upper ends of the pair of inclined side surfaces 72. The protruding end surface 74 includes a recessed part 74a slightly recessed toward the bead base 60 and disposed at the middle of the width direction and raised parts 74b slightly raised at respective widthwise ends. The raised parts 74b are smoothly curved outward in the width direction and continuously joined to the pair of inclined side surfaces 72.

To improve the sealing performance of the first bead portion 52 and the second bead portion 54, the membrane thickness of the rubber seal 70 is sufficiently large compared with the thickness of ink applied by, for example, typical relief (letterpress) printing (10 μm or less). For example, the membrane thickness of the rubber seal 70 (distance from the top part 64 of the bead base 60 to the raised parts 74b) is in the range of 50 to 150 μm.

Materials (resin materials) of the rubber seal 70 include, for example, thermosetting elastomers, thermoplastic elastomers, or other elastomers (such as silicone elastomer, urethane elastomer, fluoroelastomer, etc.); synthetic rubbers; and natural rubbers. In this embodiment, silicone type is applied to the material of the rubber seal 70. The rubber seal 70 may be formed by first applying a first liquid material to thereby form a convex first protrusion (not illustrated) and then applying a second liquid material that is less viscous than the first liquid material on the first protrusion to thereby form a substantially trapezoidal second protrusion (not illustrated).

Next, a screen printing device 80 configured to form the rubber seal 70 on the bead base 60 will be described with reference to FIG. 3. The screen printing device 80 includes a print bed 82 on which a workpiece W is placed and secured. The workpiece W is an uneven plate (corrugated plate or patterned indented plate) of the metal separator 10 with the bead base 60 formed thereon but without any rubber seals 70 formed thereon. The workpiece W is placed on the print bed 82 with the top part 64 of the bead base 60 facing vertically upward.

The screen printing device 80 further includes a screen 84 (printing plate) disposed above the workpiece W placed on the print bed 82 and a squeegee 86 that moves across the screen 84. The screen printing device 80 according to this embodiment further includes stopper portions 88 between the screen 84 and the base portion 48 of the workpiece W placed on the print bed 82.

The screen 84 includes, inside a frame (not illustrated) with a size according to the size of the workpiece W, cover portions 90 that cover the workpiece W and openings 92 (print pattern) in positions facing the sealing beads 50. The cover portions 90 are made of a mesh 84a (gauze) stretched inside the frame and emulsion 84b applied to the mesh 84a. The mesh 84a is exposed at the openings 92 since the emulsion 84b is not applied to the areas of the openings 92. The screen 84 provided with the cover portions 90 and the openings 92 is formed by first applying the emulsion 84b to the mesh 84a inside the frame, secondly masking areas that do not face the bead bases 60, and lastly washing the emulsion 84b off from areas other than the masked areas.

The screen 84 formed as above elastically deforms downward due to the pressing by the squeegee 86 in motion and elastically recovers after the passage of the squeegee 86. The thickness of the screen 84 at the opening 92 is substantially equal to the membrane thickness of the rubber seal 70 to be formed, and the width Wo of the opening 92 is substantially equal to the width of the rubber seal 70 to be formed.

The squeegee 86 has a plate shape extending along the short side direction of the screen 84 (in the direction of the arrow C in FIG. 1). The squeegee 86 is a squeezing member that presses out (or squeezes out) the liquid material for forming rubber seals by sliding along the long side direction of the screen 84 (in the direction of the arrow B in FIG. 1) while in contact with the screen 84. That is, the moving direction of the squeegee 86 corresponds to the long side direction of the metal separator 10 (i.e., the direction in which the reactant gases flow). The length of the squeegee 86 extending in the direction of the arrow C is set to be substantially equal to the length of the short sides of the metal separator 10. The squeegee 86 is formed of an elastic member with a predetermined thickness and is brought into contact with the screen 84.

The inclined elastic member pushes the liquid material applied onto the screen 84, in the travel direction and in the downward direction while moving. That is, the squeegee 86 pushes the liquid material in the direction of travel while sliding on the cover portions 90, and forces the liquid material down the screen 84 through the mesh 84a while sliding on the opening 92.

The stopper portions 88 according to this embodiment are each formed into a sheet shape with a predetermined thickness T and are joined to the lower surface of the screen 84 (an opposed surface 85 facing the workpiece W). Thus, the stopper portions 88 prevent the screen 84 from being depressed while the squeegee 86 moves. The stopper portions 88 are disposed in the vicinity of the opening 92 of the screen 84 and adjacent to at least one of the inclined parts 62 of the bead base 60.

The joining means for joining the screen 84 and the stopper portions 88 is not particularly limited and may include, for example, bonding, welding, and using engagement structures (such as fitting, screwing, and using hooks). In a case of bonding, for example, the stopper portions 88 are provided with adhesive layers (not illustrated) on the upper surfaces 88a to be joined to the opposed surface 85 of the screen 84. The stopper portions 88 are bonded to the opposed surface 85 during the production of the screen 84.

The lower surfaces 88b of the stopper portions 88 facing the workpiece W are formed into flat surfaces parallel to the opposed surface 85 of the screen 84. When the screen 84 is positioned above the workpiece W in the screen printing, the lower surfaces 88b face the surface 11Aa or 11Ba of the workpiece W in substantially parallel to each other and in a non-contact manner. As illustrated in FIG. 5A, the stopper portions 88 elastically deform downward together with the screen 84 due to the pressing by the squeegee 86, and the lower surfaces 88b then come into contact with the workpiece W.

The stopper portions 88 are disposed on both sides of the opening 92 in the width direction so as to sandwich the opening 92 therebetween. That is, when the screen 84 is positioned above the workpiece W, the pair of stopper portions 88 are located in positions adjacent to the bead base 60 above the base portion 48 without contact with the bead base 60. In a case where two bead bases 60 are arranged in parallel, the stopper portions 88 only necessary to be disposed adjacent to one of the bead bases 60.

The stopper portions 88 continuously extend parallel to the direction of extension of the opening 92 (print pattern). As a result, at the area where the opening 92 is formed, the screen 84 includes a triple line formed of the stopper portion 88, the opening 92, and the stopper portion 88 arranged in the width direction. Incidentally, the stopper portions 88 may have a configuration in which line segments having a predetermined length are arranged in a dot line manner, without one line continuously extending in the direction of extension of the opening 92. Alternatively, the stopper portions 88 may cover the entire opposed surface 85 of the screen 84 except for areas where protruding portions (the ridges 31 and 33 and the bead bases 60) are formed on the uneven plate.

When viewed in cross-section, the distance D from the edge of the opening 92 to the stopper portion 88 (minimum distance between the stopper portion 88 and the opening 92) is shorter than, for example, the width Wo of the opening 92, although depending on the shape of the inclined parts 62 of the bead base 60. For example, the proportion of the distance D to the width Wo of the opening 92, in percentage, may be in the range of 10 to 50% (for example, 0.1 to 1.5 mm in actual size). In a case where the proportion of the distance D to the width Wo of the opening 92 is greater than 50%, the stopper portions 88 are too far away from the opening 92, so that the squeegee 86 may drop immediately before the opening 92. By contrast, in a case where the proportion of the distance D to the width Wo of the opening 92 is less than 10%, the stopper portions 88 are too close to the opening 92, so that the liquid material applied through the opening 92 may easily adhere to the stopper portions 88.

Moreover, when viewed in cross-section, it is preferable that the width Ws of the stopper portions 88 be larger than the width Wb of the bead base 60 (the protruding portion of the workpiece W). This enables the squeegee 86 to slide along the long side of the screen 84 while the squeegee 86 is suitably prevented from dropping in a wide range in the vicinity of the opening 92.

It is preferable that the thickness T of the stopper portions 88 (the protruding length from the opposed surface 85 of the screen 84) be slightly smaller (shorter) than the height H of the bead base 60 from the surface 11Aa or 11Ba of the metal separator 10. For example, it is preferable that the proportion of the thickness T of the stopper portions 88 to the height H of the bead base 60, in percentage, be in the range of 60 to 95%. In a case where the proportion of the thickness T of the stopper portions 88 is less than 60%, the screen 84 is depressed as the squeegee 86 moves, resulting in the surface pressure drop. By contrast, in a case where the proportion of the thickness T of the stopper portions 88 is greater than 95%, when the stopper portions 88 are displaced, the stopper portions 88 may come into contact with the inclined parts 62 of the bead base 60 to thereby cause the screen 84 to be raised upward (i.e., worsening the flatness of the screen 84).

The material of the stopper portions 88 is not particularly limited, and a resin or metal material with a predetermined elastic modulus may be applied. For example, a material with an elastic modulus greater than that of the cover portions 90 of the screen 84 may be applied to the stopper portions 88. This enables the stopper portions 88 to support the screen 84 more reliably. Moreover, for example, the material of the emulsion 84b of the screen 84 may be used for the stopper portions 88 so that the stopper portions 88 are joined to the screen 84 more firmly.

The thickness T of the stopper portions 88 may be larger on the upstream side in the moving direction of the squeegee 86 and smaller on the downstream side in the moving direction of the squeegee 86. Moreover, the stopper portions 88 are not necessarily provided at both widthwise sides of the opening 92 but may be provided only on the upstream side of the opening 92 in the moving direction of the squeegee 86. Furthermore, the screen 84 may have a portion that is not provided with the stopper portions 88, in areas where the opening 92 extends in the moving direction of the squeegee 86 (direction of the arrow B).

The rubber seals 70 provided on the metal separators 10 according to this embodiment are basically configured as above. Next, the method of producing the rubber seal 70 will be described.

As illustrated in FIG. 4A, a method of producing a metal separator 10 includes a plate machining step (step S1), a passage forming step (step S2), and a rubber-seal forming step (step S3), which are performed in this order.

In the plate machining step, a plate (not illustrated) constituting the metal separator 10 is placed on a die of a press (not illustrated). After the placement, the die of the press is operated to press-form the reactant gas flow field 16 and the bead bases 60 of the sealing beads 50 on the metal separator 10. As a result, the plate is press-formed into an uneven plate having projections and recesses that constitute the reactant gas flow field 16 and the bead bases 60.

In the passage forming step, the uneven plate obtained in the plate machining step is placed on a cutting device (not illustrated). After the placement, the cutting device bores the fluid passages 36 through the uneven plate using a piercing die. In the production of the metal separator 10, the reactant gas flow field 16 and the bead bases 60 may be formed after the fluid passages 36 have been formed. Alternatively, pressing (formation of the projections and recesses) and cutting (formation of the fluid passages 36) may be performed simultaneously.

In the rubber-seal forming step, screen printing is performed on the top parts 64 of the bead bases 60 to thereby form the rubber seals 70. As illustrated in FIG. 4B, the rubber-seal forming step includes a placement step (step S3-1), a liquid-material applying step (step S3-2), and a squeegee moving step (step S3-3) performed in this order.

In the placement step, the workpiece W having the surface with the projections and recesses and the fluid passages 36 (the uneven plate of the metal separator 10 without the rubber seals 70) is placed on the print bed 82 of the screen printing device 80 (see also FIG. 3). After the placement, the workpiece W is secured with the top parts 64 of the bead bases 60 facing vertically upward.

Subsequently, the screen printing device 80 arranges the screen 84 above and adjacent to the secured workpiece W. The stopper portions 88 are affixed in advance to the opposed surface 85, serving as the lower surface of the screen 84, facing the workpiece W. Thus, in a state that the screen 84 is in place, the openings 92 are disposed in positions facing the bead bases 60, and the stopper portions 88 are disposed adjacent to the bead bases 60 above the base portion 48. The stopper portions 88 are disposed between the screen 84 and the workpiece W and slightly separated from the workpiece W.

In the liquid-material applying step, the screen printing device 80 applies the liquid material for the rubber seals 70 on the screen 84 (on a surface opposite the opposed surface 85). The screen printing device 80 may apply, as needed, the liquid material upstream in the moving direction of the squeegee 86 as the squeegee 86 moves.

In the squeegee moving step, the squeegee 86 is lowered to be brought into contact with the upper surface of the screen 84, and then moved along the surface of the screen 84 (in the direction of the arrow B; in the direction of flow of the reactant gases). As illustrated in FIG. 5A, the squeegee 86 slides while pressing the screen 84 downward. This causes part of the screen 84 that is in contact with the squeegee 86 to elastically deform downward.

While the squeegee 86 moves, the stopper portions 88 joined to the screen 84 prevent the screen 84 from being depressed downward (toward the workpiece W) in the positions outside and adjacent to the widthwise ends of the bead bases 60. In a case of a screen printing device 100 that is not provided with the stopper portions 88, there is a concern that a screen 104 may be depressed downward due to the pressing by a squeegee 102 as indicated by long dashed double-short dashed lines in FIG. 5A. This causes the squeegee 102 to jump up from the upper surface of the depressed screen 104 in the vicinity of the openings 92, and the surface pressure (pressing force) applied to the screen 104 by the squeegee 102 is lost or weakened in the vicinity of the openings 92 due to the jumping.

By contrast, in the method of producing the rubber seal 70 according to this embodiment, the stopper portions 88 disposed between the screen 84 and the workpiece W prevent the surface pressure from being weakened while the squeegee 86 moves. That is, when the screen 84 is pressed by the squeegee 86, the lower surfaces 88b of the stopper portions 88 immediately come into contact with the workpiece W, and portions of the screen 84 that have the stopper portions 88 joined thereto are supported by the stopper portions 88. Consequently, the screen 84 is prevented from being depressed in the vicinity of the bead bases 60, and the squeegee 86 moves smoothly in the direction of the arrow B (horizontal direction) without jumping up from the screen 84 in the vicinity of the openings 92.

As a result, the squeegee 86 can apply a predetermined surface pressure uniformly on the screen 84 while moving across the openings 92. When the squeegee 86 passes across the openings 92 as illustrated in FIG. 5B, the mesh 84a at the openings 92 is pressed by the squeegee 86 and comes into contact with the top parts 64 of the bead bases 60. In this state, the squeegee 86 squeezes the liquid material down through the openings 92. After the squeegee 86 passes across the openings 92, part of the screen 84 in the vicinity of the openings 92 separates from the top parts 64 of the bead bases 60, and the liquid material is left and applied on the top parts 64 of the bead bases 60 in a preferred manner (see also FIG. 2).

In the method of producing the rubber seal 70 described above, the liquid material is stably applied on the bead bases 60. Thus, after the liquid material is cured (hardened), the rubber seals 70 achieve a set membrane thickness in a preferred manner. As a result, the metal separator 10 provided with the rubber seals 70 exhibits excellent sealing performance of the sealing beads 50 in sealing the resin-frame-equipped MEA 14.

The present invention is not limited in particular to the embodiment described above, and various modifications and improvements can be made thereto without departing from the scope of the invention. For example, the stopper portions 88 attached to the cover portions 90 in the vicinity of the openings 92 of the screen 84, may be integrally formed with the cover portions 90 during the production of the cover portions 90 (emulsion 84b); in other words, the stopper portions may be formed by making parts of the cover portions 90 that are positioned in the vicinity of the openings 92 thick. Moreover, for example, the stopper portions 88 may be simply disposed between the screen 84 and the workpiece W without being joined to the screen 84 or the workpiece W.

In a case where the distance D is small, for example, part of the stopper portions 88 adjacent to the bead bases 60 may be inclined along the inclined parts 62 of the bead bases 60. With this structure, the stopper portions 88 can preferably prevent the screen 84 from being depressed in the vicinity of the openings 92 while the squeegee 86 is in motion.

Figure 6:
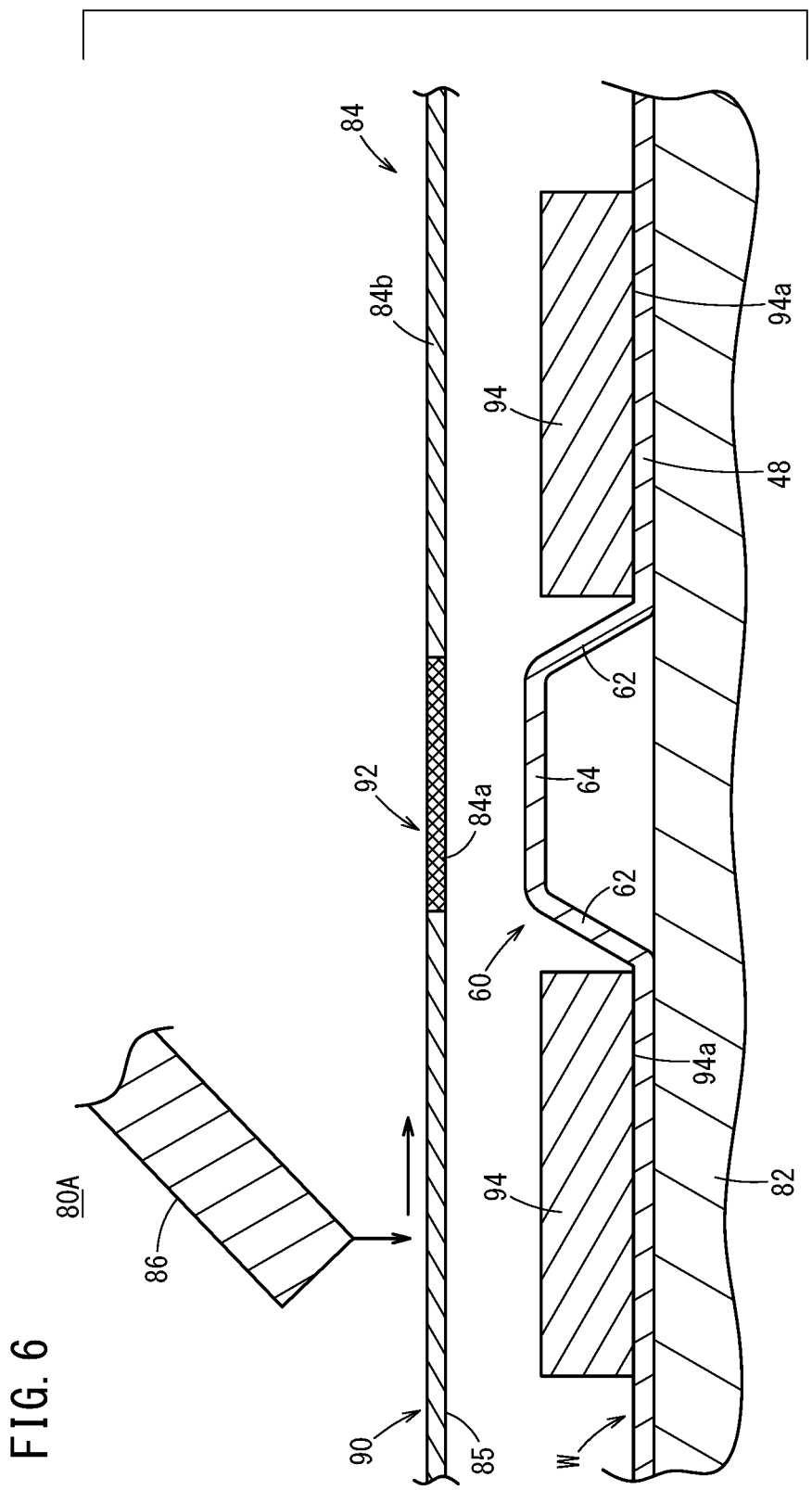
FIG. 6 is a partial sectional view of a screen printing device for forming rubber seals according to a modification.

A screen printing device 80A according to a modification illustrated in FIG. 6 differs from the screen printing device 80 according to the above embodiment in that stopper portions 94 that prevent the screen 84 from dropping are joined to the workpiece W (metal separator 10). For example, in the production process of the rubber seals 70, the stopper portions 94 including adhesive parts on the lower surfaces 94a are prepared and then affixed to regions of the workpiece W that correspond to regions of the screen 84 that are likely to be depressed, before the workpiece W is placed in the screen printing device 80A.

In this manner, the stopper portions 94 can also be disposed between the screen 84 and the workpiece W in the screen printing device 80A according to the modification. As a result, the screen 84 is prevented from being depressed while being pressed by the squeegee 86, and the liquid material with a predetermined thickness can be stably applied on the bead bases 60 in the production of the rubber seals 70.

After the screen printing, the stopper portions 94 affixed to the workpiece W can be removed from the workpiece W, and those removed stopper portions can be reused to produce the rubber seals 70 on another workpiece W. Alternatively, the stopper portions 94 may be left on the metal separator 10 even after the production of the rubber seals 70, and those left stopper portions can be used as members that prevent the sealing beads 50 from collapsing when the fuel cell 12 are stacked.

The technical scope and advantageous effects that can be understood from the above-described embodiment will be described below.

According to an aspect of the present invention, a method of producing a rubber seal 70 includes placing a screen 84 with an opening 92, above a workpiece W including a base portion 48 and a protruding portion (bead base 60) protruding from the base portion 48 and applying a liquid material for forming the rubber seal, onto a top part 64 of the protruding portion through the opening 92 by moving a squeegee 86 along a surface of the screen 84 in a state where a stopper portion 88, 94 is disposed at a position adjacent to the protruding portion within an area of the base portion 48 and between the screen 84 and the workpiece W.

According to the method of producing the rubber seal 70, the stopper portion 88, 94 disposed in the position adjacent to the bead base 60 and between the screen 84 and the workpiece W can prevent the screen 84 from being depressed due to the pressing by the moving squeegee 86. This allows the squeegee 86 to move smoothly in the vicinity of the protruding portion (bead base 60) without jumping and to apply a uniform surface pressure on the screen 84 in the moving direction. As a result, the liquid material can be discharged in a preferred manner, and the uniformity in the thickness and shape of the rubber seal 70 formed by the production method can be improved.

The stopper portion 88, 94 is joined to the screen 84 or the workpiece W. Thus, in the method of producing the rubber seal 70, the stopper portion 88, 94 can be easily positioned in the position adjacent to a side of the protruding portion (bead base 60) with the opening 92 of the screen 84 being disposed to face the workpiece W.

A thickness T of the stopper portion 88, 94 is less than a height H of the protruding portion (bead base 60). Thus, in the method of producing the rubber seal 70, the opening 92

(mesh 84a) of the screen 84 can be reliably brought into contact with the protruding portion to apply the liquid material onto the protruding portion while the screen 84 is prevented from being depressed by the stopper portion 88, 94.

A distance D from an edge of the opening 92 to the stopper portion 88, 94 is set within a range of 10 to 50% of a width Wo of the opening 92. With this structure, the stopper portion 88, 94 can more reliably prevent the screen 84 from being depressed in the vicinity of the opening 92.

A width Ws of the stopper portion 88, 94 is greater than a width Wb of the protruding portion (bead base 60). With this structure, the stopper portion 88, 94 enables the squeegee 86 to move smoothly in the vicinity of the opening 92 and enables the liquid material to be applied to the protruding portion more uniformly.

The workpiece W is a metal separator 10 applied to a fuel cell 12, and the metal separator 10 includes the rubber seal 70 formed on the bead base 60 serving as the protruding portion integrally formed with the metal separator 10 and protruding from a surface 11Aa, 11Ba of the metal separator 10. Thus, in the production of the metal separator 10, the method of producing the rubber seal 70 can significantly increase the sealing performance of the rubber seal 70.

The metal separator 10 includes a reactant gas flow field 16 through which reactant gas flows when the fuel cell 12 generates electricity, and the squeegee 86 moves in a direction along which the reactant gas flows on the metal separator 10. Thus, in the method of producing the rubber seal 70, while the squeegee 86 is in motion, a constant surface pressure is applied onto, for example, a bead portion (the outer bead 52a, 54a and the inner bead 52b, 54b) extending in a direction intersecting with the direction of flow of the reactant gas and peripheries of the fluid passages 36 arranged in a direction substantially orthogonal to the direction of flow. As a result, the rubber seal 70 of the sealing bead 50 can be formed in a stable manner.

What is claimed is:

1. A method of producing a rubber seal, comprising:
   placing a screen with an opening, above a metal separator applied to a fuel cell including a base portion, a protruding portion protruding from the base portion, and a reactant gas flow field through which reactant gas flows when the fuel cell generates electricity; and
   applying a liquid material for forming the rubber seal, onto a top part of the protruding portion through the opening by moving a squeegee along a surface of the screen in a direction along which the reactant gas flows on the metal separator in a manner that the squeegee pushes the screen downward, in a state where a stopper portion is disposed at a position adjacent to the protruding portion within an area of the base portion and between the screen and the metal separator, wherein a thickness of the stopper portion is less than a height of the protruding portion; and
   wherein the rubber seal is formed on a bead base serving as the protruding portion integrally formed with the metal separator and protruding from a surface of the metal separator.

2. The method of producing the rubber seal according to claim 1, wherein the stopper portion is joined to the screen or the metal separator.

3. The method of producing the rubber seal according to claim 1, wherein a distance from an edge of the opening to the stopper portion is set within a range of 10 to 50% of a width of the opening.

4. The method of producing the rubber seal according to claim 1, wherein a width of the stopper portion is greater than a width of the protruding portion.

* * * * *